United States Patent
Sorge

(10) Patent No.: US 10,483,810 B2
(45) Date of Patent: Nov. 19, 2019

(54) VARIABLE-DISTANCE WIRELESS-POWER-TRANSFER SYSTEM WITH FIXED TUNING AND POWER LIMITING

(71) Applicant: Murata Manufacturing Co., Ltd., Nagaokakyo-shi, Kyoto-fu (JP)

(72) Inventor: Jeffrey John Sorge, Westminster, CO (US)

(73) Assignee: MURATA MANUFACTURING CO., LTD., Kyoto (JP)

( * ) Notice: Subject to any disclaimer, the term of this patent is extended or adjusted under 35 U.S.C. 154(b) by 374 days.

(21) Appl. No.: 15/514,894

(22) PCT Filed: Nov. 6, 2015

(86) PCT No.: PCT/US2015/059491
§ 371 (c)(1),
(2) Date: Mar. 28, 2017

(87) PCT Pub. No.: WO2016/073867
PCT Pub. Date: May 12, 2016

(65) Prior Publication Data

US 2017/0237302 A1     Aug. 17, 2017

Related U.S. Application Data

(60) Provisional application No. 62/076,641, filed on Nov. 7, 2014.

(51) Int. Cl.
*H01F 27/42* (2006.01)
*H01F 37/00* (2006.01)
(Continued)

(52) U.S. Cl.
CPC .............. *H02J 50/90* (2016.02); *H02J 7/025* (2013.01); *H02J 7/045* (2013.01); *H02J 50/12* (2016.02);
(Continued)

(58) Field of Classification Search
CPC .. H02J 50/12; H02J 50/90; H02J 7/025; H02J 7/045; H04B 5/0037; H04B 5/0075
(Continued)

(56) References Cited

U.S. PATENT DOCUMENTS

2012/0086281 A1\* 4/2012 Kanno .................... H02J 5/005
                                                                              307/82
2012/0169137 A1    7/2012 Lisi et al.
(Continued)

FOREIGN PATENT DOCUMENTS

KR    10-2014-0057506 A    5/2014

OTHER PUBLICATIONS

Official Communication issued in International Patent Application No. PCT/US2015/059491, dated Feb. 19, 2016.
(Continued)

*Primary Examiner* — Rexford N Barnie
*Assistant Examiner* — Toan T Vu
(74) *Attorney, Agent, or Firm* — Keating & Bennett, LLP

(57) ABSTRACT

A wireless-power-transfer system includes a transmitter circuit and a receiver circuit. The transmitter circuit includes a primary series-resonant capacitor connected to an oscillator-controlled drive stage that provides fixed-frequency output and a transmitting coil connected to the primary series-resonant capacitor. The transmitting resonant frequency is below the fixed frequency of the oscillator-controlled drive stage. The receiver circuit includes a receiving coil, a secondary series-resonant capacitor connected in series with the receiving coil, and a secondary parallel-resonant capaci-
(Continued)

tor connected in parallel with the receiving coil. The receiving resonant frequency increases as a nonlinear capacitance of the at least one rectifier decreases when the rectifier-circuit DC output increases.

10 Claims, 8 Drawing Sheets

(51) Int. Cl.
      *H01F 38/00*    (2006.01)
      *H02J 50/90*    (2016.01)
      *H04B 5/00*    (2006.01)
      *H02J 50/12*    (2016.01)
      *H02J 7/02*    (2016.01)
      *H02J 7/04*    (2006.01)

(52) U.S. Cl.
      CPC ......... *H04B 5/0037* (2013.01); *H04B 5/0075* (2013.01)

(58) Field of Classification Search
      USPC ........................................................ 307/104
      See application file for complete search history.

(56) References Cited

U.S. PATENT DOCUMENTS

| | | |
|---|---|---|
| 2013/0300210 A1 | 11/2013 | Hosotani |
| 2013/0301308 A1 | 11/2013 | Hosotani |
| 2014/0001882 A1 | 1/2014 | Cook et al. |
| 2014/0084701 A1 | 3/2014 | Bae |
| 2014/0111151 A1 | 4/2014 | Keeling et al. |
| 2014/0125142 A1 | 5/2014 | Kanno |

OTHER PUBLICATIONS

Hosotani, "A Novel Direct Current Resonance ZVS Wireless Power Transfer System and 10MHz-Class Experimental operation with GaN FET", Proceedings of the IEICE General Conference Papers, 2013, 2 pages.

Hosotani, "A Novel Design Theory of a Direct Current Resonance Wireless Power Transfer System and 10MHz-Class Experimental Operation with GaN FET", Presented at the Springs Science Lecture Meeting of the Automotive Engineering Society of May 22, 2013, May 22, 2013, 6 pages.

Obayashi et al., "A Novel Study for a 10MHz-Class Multi-Resonant ZVS Wireless Power Transfer System with Direct Current Resonance", Proceedings of the IEICE General Conference Papers, 2013, 2 pages.

Texas Instruments Incorporated, "High-Efficiency Qi v1.1-Compliant Wireless Power Receiver and Battery Charger", SLUSB42D, Jan. 2014, 35 pages.

Hosotani, "DC-Resonance Powers Wireless Transfer", Asia Electronics Industry, Jul. 2013, pp. 18-20.

Jang et al., "HF-Band Wireless Power Transfer System: Concept, Issues, and Design", Progress in Electromagnetics Research, vol. 124, 2012, pp. 211-231.

Hosotani et al., "A Novel Analysis of ZVS Wireless Power Transfer System Using Coupled Resonators", FRI-H-5, Microwave Workshop Services on Innovative Wireless Power Transmission: Technologies, Systems, and Applications (IMWS), 2012, pp. 235-238.

Texas Instruments, "Industry-Leading Wireless Power Solutions", 2013, 3 pages.

Pannier et al , "Wireless Power Transfer for Industrial Applications Through Strongly Coupled Magnetic Resonances", 2009, 6 pages.

* cited by examiner

VARIABLE-DISTANCE WIRELESS-POWER-TRANSFER SYSTEM WITH FIXED TUNING AND POWER LIMITING

BACKGROUND OF THE INVENTION

1. Field of the Invention

The present invention relates to wireless-power transfer, and more specifically, the present invention relates to a wireless-power-transfer system that compensates for variations in a distance between a transmit coil and a receive coil of a resonant wireless-power-transfer system to provide a high-power transmission efficiency.

2. Description of the Related Art

Wireless-power-transfer systems have been used to provide power to devices without the need for direct and physical connections, such as cables or wires. Various methods have been used for transmitting power wirelessly, including capacitive coupling, resonant inductive coupling, laser light, and microwave beams. Wireless-power-transfer systems that use resonant inductive coupling provide relatively efficient power transfer from a transmit coil to a receive coil at relatively short coil-separation distances. More specifically, resonant inductive coupling is less expensive than methods such as laser light and microwave beams, and also provides advantages over simple magnetic induction coupling. Simple magnetic induction coupling has been used, for example, to charge electric toothbrushes or cellular phones placed directly upon a charging mat, but only allows for very limited coil-separation distances of less than one coil diameter.

In a loosely-coupled resonant wireless-power-transfer system, it is desirable to be able to move the transmit and/or the receive coils over a wide range of distances without requiring that the system resonances be constantly retuned. A resonant wireless-power-transfer system is considered to be loosely coupled if a majority of the flux generated by the primary coil is not received by the receiving coil. Taking into account the variation with distance of the coupling coefficient K between the transmit and the receive coils and the variation of the output voltage of the nonlinear reverse-biased capacitance of the rectifiers in the receiver, a specific tuning can be established that allows for coil-separation distances over a range of one to five coil diameters without retuning.

The coupling coefficient K indicates the proportion of flux from the transmit coil that penetrates the receive coil and is generally related to: (1) the mutual inductance of the transmit and receive coils when they are coupled to each other and (2) the self-inductance of each of the transmit and receive coils when the transmit and receive coils are stand-alone, uncoupled coils. The coupling coefficient K typically has a value between zero and one, with a value of zero indicating that there is no mutual flux, and thus no mutual inductance, between the transmit and receive coils. A value of one for the coupling coefficient K indicates that all of the flux from the transmit coil is received by the receive coil, and thus the self-inductance of each of the transmit and receive coils is the same as the overall mutual inductance between the transmit and receive coils. However, the coupling coefficient K may also have a negative value, for example, if the polarity of one of the transmit and receive coils is reversed, such that the voltage induced in the receive coil is 180 degrees out of phase with respect to the voltage in the transmit coil. Further, it is difficult to precisely determine the coupling coefficient K between transmit and receive coils, as equations for determining the mutual and self-inductances of the transmit and receive coils are complex, and measurements made to determine the coupling coefficient K are inaccurate, especially for low values of the coupling coefficient K.

One known method of retuning resonances in resonant wireless-power-transfer systems relies on varactors, which are a type of diode whose capacitance varies as a function of the voltage applied across its terminals. Varactors have been used as voltage-controlled capacitors in resonant wireless-power-transfer systems to deliver maximum power as the coil separation distance changes. However, varactors incur undesirable power losses in resonant wireless-power-transfer systems, and varactors often require complex control circuits or systems.

Another known method of retuning resonances in resonant wireless-power-transfer systems is to vary the operating frequency of the transmit and receive oscillators to maintain operation of the resonant wireless-power-transfer systems at their respective system resonant frequencies. However, if power-transfer frequencies are in the industrial, scientific, and medical (ISM) radio bands in which electromagnetic interference is internally permitted, very little bandwidth is available to allow for changes in the operating frequencies.

According to a known method, the voltage at the receiver output of a resonant wireless-power-transfer system can be limited by using larger value capacitors at the rectifier inputs to detune the receiver when an overvoltage condition occurs at the output, which helps to shunt the resonant tuning and power transfer between the transmit and receive coils to prevent excessive voltage gain. In particular, excessive voltage gain in the receiver may be prevented if a load of the receiver is small by forcing the wireless-power-transfer system to operate intermittently. However, this method causes power transfer to the receiver to stop, which reduces the amount of power that can be received.

According to another known method, the receiver output can be directly connected to a battery to prevent overloading of the receiver by forcing the receiver output voltage to be fixed to the battery voltage. Accordingly, a resonant wireless-power-transfer system including a battery at the receiver output is not subjected to constant re-tuning to attempt to receive the maximum amount of power available at the receive coil from the transmit coil every time the coupling coefficient K changes. More specifically, the battery presents a substantially fixed voltage for the load of the receiver, which provides a stable operating point on the power-transfer curve of the receiver output characteristics. However, this method forces the receiver output voltage to be fixed to the battery voltage, which is unlikely to be set at the maximum power-transfer point on the power-transfer curve of the receiver output characteristics.

Although the receiver could be tuned to provide a constant or substantially constant voltage output with respect to distance at the maximum power points, such an arrangement would prevent the receiver from providing power to the load if the power transfer is started at a relatively long coil-separation distance. More specifically, at a sufficiently high coil-separation distance, the receiver output voltage is close enough to zero volts that the rectifiers in the receiver are in an off state, and the reverse voltage across the rectifiers in this state is sufficiently close to zero, which increases the nonlinear receiver capacitance. Accordingly, the nonlinear receiver capacitance becomes too high to provide adequate gain to charge the output capacitor of the receiver to the operating voltage of the load.

According to yet another known method, an under-voltage lockout circuit can be added to the receiver output voltage such that if the receiver output voltage falls below a predetermined level, a DC-DC stage of the resonant wireless-power-transfer system is turned off. When the receiver output voltage rises above another predetermined level, the DC-DC stage is turned back on again. However, this method of operation results in intermittent operation of the wireless-power-transfer system, and only provides overload protection, and no tuning or re-tuning, for the resonant wireless-power-transfer system.

Thus, the above-described known methods result in the loss of efficiency in resonant wireless-power-transfer systems and/or require complex control circuits or systems.

SUMMARY OF THE INVENTION

To overcome the problems described above, preferred embodiments of the present invention provide a wireless-power-transfer systems that is efficient and that does not require complex control circuits or systems.

Depending on the specific tuning of a wireless-power-transfer system, the nonlinear capacitance of the receiver's rectifiers can be used to limit the range of the DC output voltage at the rectifier output. This is desirable in wireless-power-transfer systems that include a DC-DC converter at the receiver output to provide a fixed output voltage to the system load. Excessively large voltages at the input of this DC-DC converter can result in damage to the converter, or can result in lower efficiency due to the need to use higher-voltage switching devices in the DC-DC converter. As the load is reduced, or as the transmit and receive coils are moved closer together, the receiver output may be subjected to large increases in voltage.

Thus, to overcome the problems described above, preferred embodiments of the present invention provide a rectifier nonlinear capacitance as part of the overall resonant network such that reductions in the rectifier capacitance as the rectifier output voltage increases result in the automatic retuning of the receiver resonance to a higher frequency. Because the operation of the wireless-power-transfer system is at a fixed frequency, the resonant gain is limited by operating at a frequency below resonance. This modifies the shape of the V-I output characteristic of the receiver, depending on the relative size of the nonlinear capacitance compared to the series-resonant capacitance, as well as the degree of nonlinearity in the rectifiers.

As the coil separation increases, the amount of power provided at the receiver output decreases. According to preferred embodiments of the present invention, the power output from the receiver to a load is limited to an approximation of the maximum power that is available, to prevent overloading of the wireless-power-transfer system. In particular, according to preferred embodiments of the present invention, the current drawn from the receiver is limited to the amount of current that is actually available, which prevents a negative input impedance of the DC-DC converter stage from overloading the receiver output.

A preferred embodiment of the present invention provides a wireless-power-transfer system that includes a transmitter circuit including a DC input; an oscillator-controlled drive stage connected to the DC input and providing an output at a fixed frequency; a primary series-resonant capacitor connected to the oscillator-controlled drive stage; and a transmitting coil connected to the primary series-resonant capacitor and includes a receiver circuit including a receiving coil; a secondary series-resonant capacitor connected in series with the receiving coil; a secondary parallel-resonant capacitor connected in parallel with the receiving coil; a rectifier circuit connected to the secondary series-resonant capacitor and the secondary parallel-resonant capacitor and including at least one rectifier; and an output filter capacitor connected to the rectifier circuit and arranged to receive a rectifier-circuit DC output. A transmitting resonant frequency is defined by the primary series-resonant capacitor and the transmitting coil, and the transmitting resonant frequency is below the fixed frequency of the oscillator-controlled drive stage. A receiving resonant frequency is defined by the secondary series-resonant capacitor, the secondary parallel-resonant capacitor, the receiving coil, and a nonlinear capacitance of the at least one rectifier; and the receiving resonant frequency increases as a nonlinear capacitance of the at least one rectifier decreases when the rectifier-circuit DC output increases.

A coupling coefficient between the transmitting coil and the receiving coil is preferably about K=0.1 to about K=0.001. The wireless-power-transfer system preferably operates over a range of coil-separation distances between the transmitting coil and the receiving coil of about one to about five coil diameters of the transmitting coil. The transmitting coil and the receiving coil preferably have a same or substantially a same diameter and are positioned to achieve maximum coupling.

The rectifier circuit is preferably a full-wave bridge rectifier. The wireless-power-transfer further preferably includes detuning MOSFETs connected to a center of each bridge leg of the full-wave bridge rectifier through series detuning capacitors. The wireless-power-transfer system further preferably includes a fixed capacitor connected to an input of the full-wave bridge rectifier.

The wireless-power-transfer system further preferably includes a non-isolated DC-DC regulator connected to the receiver circuit. The wireless-power-transfer system further preferably includes a current-regulation amplifier connected to the receiver circuit. Preferably, the wireless-power-transfer system includes an upper resonant frequency and a lower resonant frequency, and the upper resonant frequency is associated with a greatest predetermined coil-separation distance between the transmitting coil and the receiving coil.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
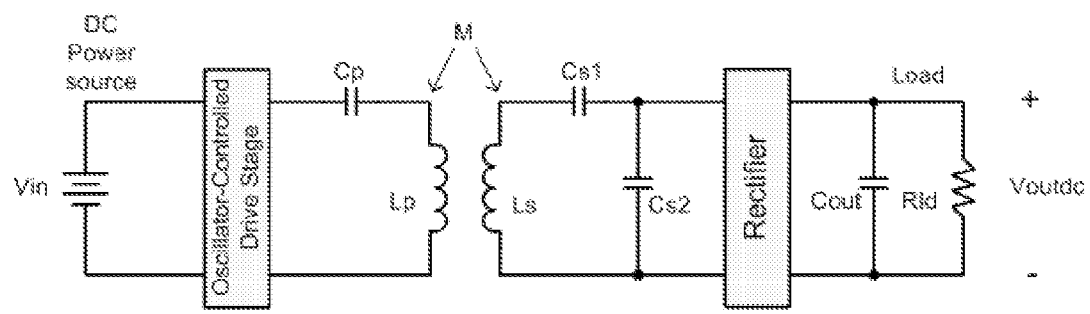
FIG. 1 is a circuit diagram of a wireless-power-transfer system that is included in preferred embodiments of the present invention.

FIG. 1 is a simplified circuit diagram of a typical wireless-power-transfer system that is included in preferred embodiments of the present invention. A DC power source is connected to an oscillator-controlled drive stage. The drive stage excites the primary resonant tank circuit, which includes a primary resonant capacitor Cp and a primary transmitting coil Lp. A secondary receiving coil Ls is connected to a rectifier circuit via a secondary series-resonant capacitor Cs1 and a secondary parallel-resonant capacitor Cs2. The rectifier circuit is connected in parallel to the parallel-resonant capacitor Cs2, which results in a DC output voltage across an output capacitor Cout that provides DC power to a load Rld.

The primary transmitting coil Lp and the secondary receiving coil Ls are coupled with a mutual inductance M, which is related to the coupling coefficient K by the equation $M = K*\sqrt{(Lp*Ls)}$. If the primary and secondary coils Lp and Ls have the same or substantially the same size, shape, and number of turns (i.e., Lp=Ls), the above equation can be simplified to $M=K*Lp$ or $M=K*Ls$. The leakage inductance on each side of the mutual inductance can thus be expressed by the equation $Llkp=Llks=Lp*(1-K)$, or $Llkp=Llks=Ls*(1-K)$, where Llkp is the primary leakage inductance and Llks is the secondary leakage inductance. Because this is a resonant system, most primary and secondary current in the primary and secondary coils Lp and Ls is in the form of a sine wave at the fundamental operating frequency determined by the oscillator-controlled drive stage. Accordingly, a first harmonic analysis can be applied to the system, ignoring the remaining harmonics, because the remaining harmonics are substantially attenuated by the resonant circuitry and the remaining harmonics deliver zero or substantially zero power. Further, the first harmonic analysis simplifies the overall system, which allows the system to be more easily evaluated in terms of its frequency response.

If the output of the drive stage is assumed to be a square wave (or a substantially square wave) with a lower level of 0 volts and an upper level of Vin volts, the output of the drive stage can be replaced by a sine wave with an rms (root mean square) value of $Vinrms=Vin*\sqrt{2/\pi}$, which is the first harmonic of the square wave voltage applied to the primary resonant tank circuit. If the output rectifier is a full-wave rectifier, then the output rectifier and the DC output load Rld can be replaced by an equivalent AC load resistance Rldac, which is provided by the equation $Rldac=8*Rld/\pi^2$. In addition, the DC output voltage is related to the first harmonic RMS voltage referred to the input side of the rectifier by the following equation: $Voutrms=Voutdc*\sqrt{8/\pi}$.

Figure 2:
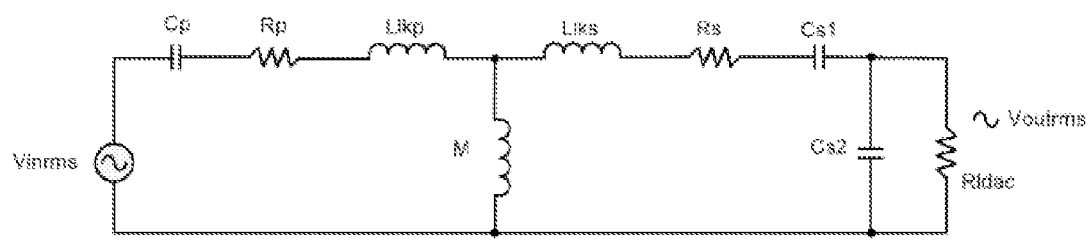
FIG. 2 is a circuit diagram of a model that approximates the behavior of a wireless-power-transfer system according to a preferred embodiment of the present invention.

According to the above description and equations, a model which approximates the behavior of the wireless-power-transfer system has been developed and is shown in FIG. 2.

Figure 3:
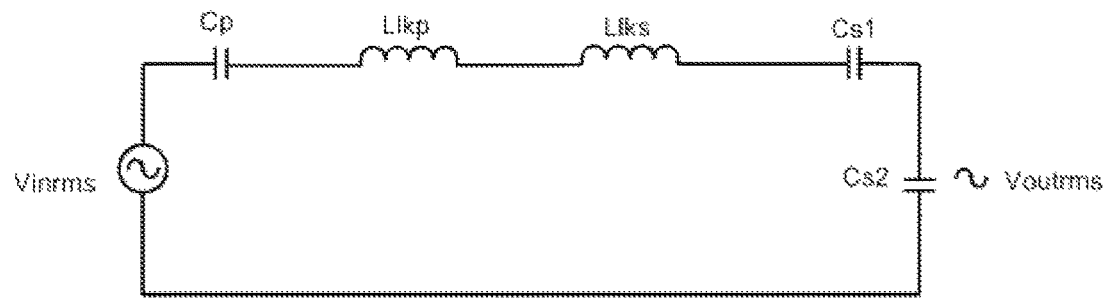
FIG. 3 is a circuit diagram of the series-resonant path from the Vinrms to Voutrms in FIG. 2.
Figure 4:
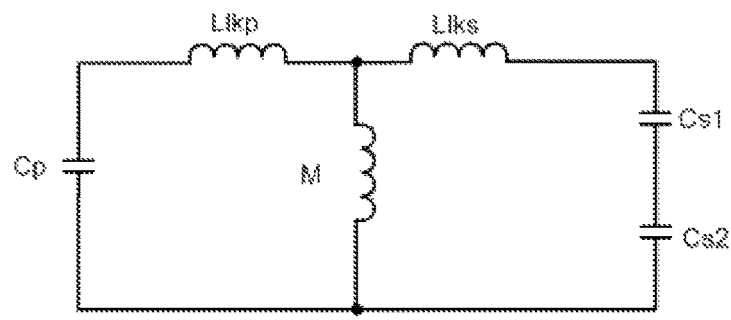
FIG. 4 is a circuit diagram of the primary and secondary resonant networks of FIG. 2 that are effectively in a parallel circuit arrangement.

In the loosely-coupled wireless-power-transfer system shown in FIG. 2, particular attention is directed to the range of coupling coefficients from K=0.1 to K=0.001, which represents an approximate range of coil-separation distances from one to five coil diameters, assuming that both coils have the same or substantially the same diameter and that both coils are positioned for maximum coupling, that is, along the same or substantially the same axis so that the coils are centered or substantially centered and parallel or substantially parallel with respect to each other. If there is misalignment and/or the coils are not centered on the same axis, the separation distance between the coils must be decreased to obtain the same coupling coefficient. The frequency response of the equivalent circuit shown in FIG. 2 provides two distinct resonant frequencies fu and fl, where fu is the upper resonant frequency and fl is the lower resonant frequency. The upper resonant frequency fu represents the series-resonant path from the Vinrms to Voutrms, as shown in FIG. 3. The lower resonant frequency fl also includes the mutual inductance M, where the primary and secondary resonant networks are effectively in a parallel circuit arrangement, as shown in FIG. 4. Primary-side and secondary-side loss resistances Rp and Rs, which are primarily related to the AC resistances of the primary and secondary coils Lp and Ls, are not shown in FIGS. 3 and 4 because these resistances are not relevant to the resonant frequencies in the frequency responses of the transmitter and receiver.

As the coupling coefficient K increases from 0.001 to 0.1, the lower resonant frequency fl decreases and the upper resonant frequency fu increases. However, within this limited range of the coupling coefficient K, the lower resonant frequency fl and the upper resonant frequency fu are close enough to each other to provide an adequate amount of resonant gain over the entire frequency range from the lower resonant frequency fl to the upper resonant frequency fu. This allows the resonant wireless-power-transfer system to provide a sufficient DC output voltage over a wide range of coil-separation distances. In particular, if the system is adjusted so that the upper resonant frequency fu is at the operating frequency associated with the greatest predetermined coil-separation distance, then, as the distance is reduced, an adequate gain is still provided in the band between the lower resonant frequency fl and the upper resonant frequency fu so that there is efficient power transfer from the primary coil to the secondary coil.

Thus, adequate gain and efficient power transfer is provided even though the wireless-power-transfer system is not operating at a resonant frequency, without the need to perform impedance matching to the complex conjugate of the receiver output impedance. For example, if the receiver has an output impedance of R+jX, an ideal load for the receiver is R−jX to provide matching for maximum power transfer. This condition is represented by a resonant peak in the frequency response curve of the wireless-power-transfer system and arises due to the secondary series-resonant capacitor Cs1 and the secondary parallel-resonant capacitor Cs2 canceling out the inductive output characteristic of the secondary coil Ls. However, if the load is not perfectly matched to the output impedance of the receiver, the impedance presented to the load has a reactive component which reduces the amount of power transferred to the load. However, sufficient power may still be output to the load if the output impedance of the receiver is relatively closely matched to the load.

Figure 5:
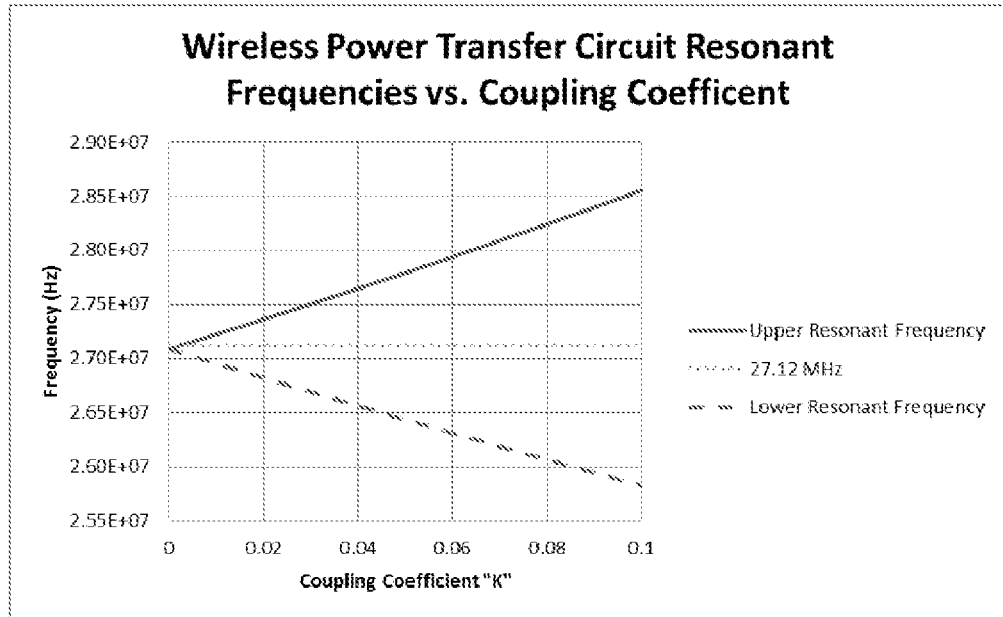
FIG. 5 is a graph that shows how the lower resonant frequency fl and the upper resonant frequency fu vary with the coupling coefficient K.
Figure 6:
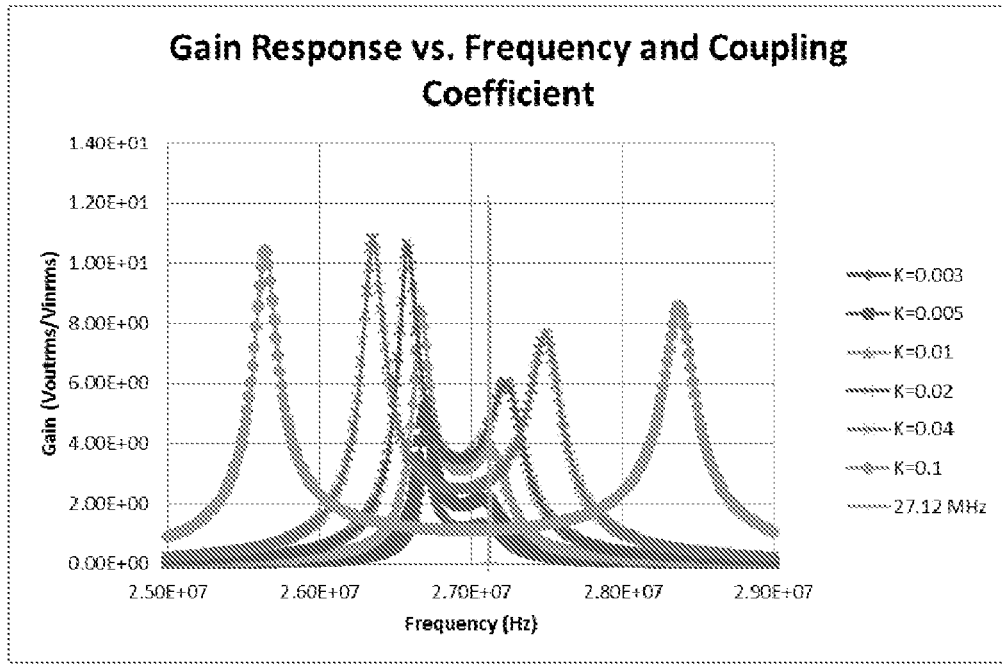
FIG. 6 shows the frequency response of the equivalent circuit in FIG. 2 with a fixed load impedance as a function of K.

FIG. 5 is a graph that shows how the lower resonant frequency fl and the upper resonant frequency fu vary with the coupling coefficient K for a wireless-power-transfer system tuned to operate at the fixed frequency of 27.12 MHz, for example. As shown in FIG. 5, as the coupling coefficient K increases and the primary and secondary coils are moved closer together, a wider range of frequencies between the lower resonant frequency fl and the upper resonant frequency fu is permitted. FIG. 6 shows the frequency response of the equivalent circuit in FIG. 2 with a fixed load impedance as a function of K. As shown in FIG. 6, the gap between the resonant frequencies that provide high gain increases as the value of K increases.

Figure 7:
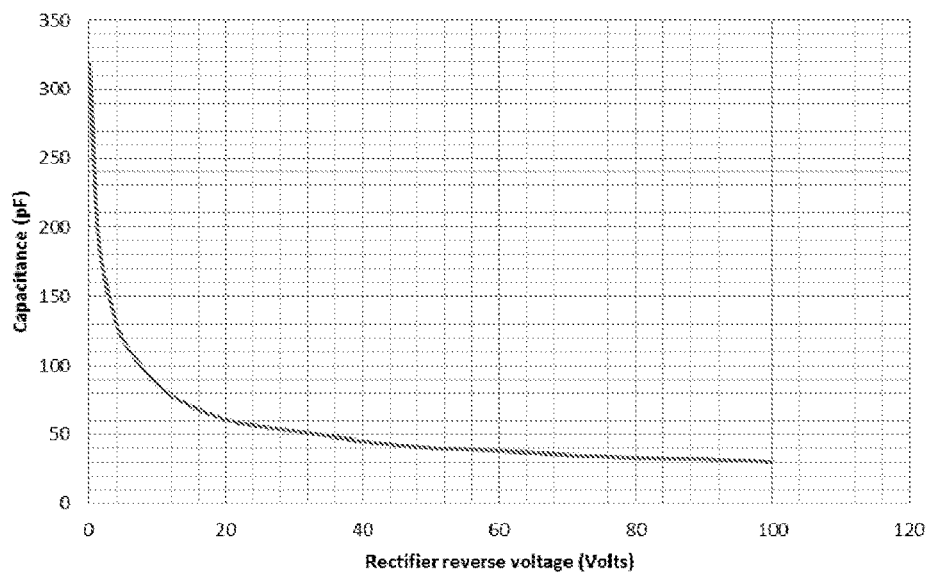
FIG. 7 shows a typical relationship between the rectifier reverse capacitance and the applied reverse voltage.

In addition to the influence of the coupling coefficient K on the receiver response, other factors influence the receiver output characteristics. In particular, the reverse-biased capacitance of the solid state rectifiers exhibits a nonlinear capacitance with respect to an applied reverse voltage such that the capacitance decreases as the voltage is increased. A typical relationship between the rectifier reverse capacitance and the applied reverse voltage is shown in FIG. 7. Preferably, the rectifier of the receiver includes Schottky rectifiers, which have a relatively low forward-voltage drop. However, standard rectifiers may be used at lower operating frequencies, if sufficient time is permitted for the reverse-recovery time of the rectifiers. Alternatively, silicon carbide or gallium nitride rectifiers may be used.

Figure 8:
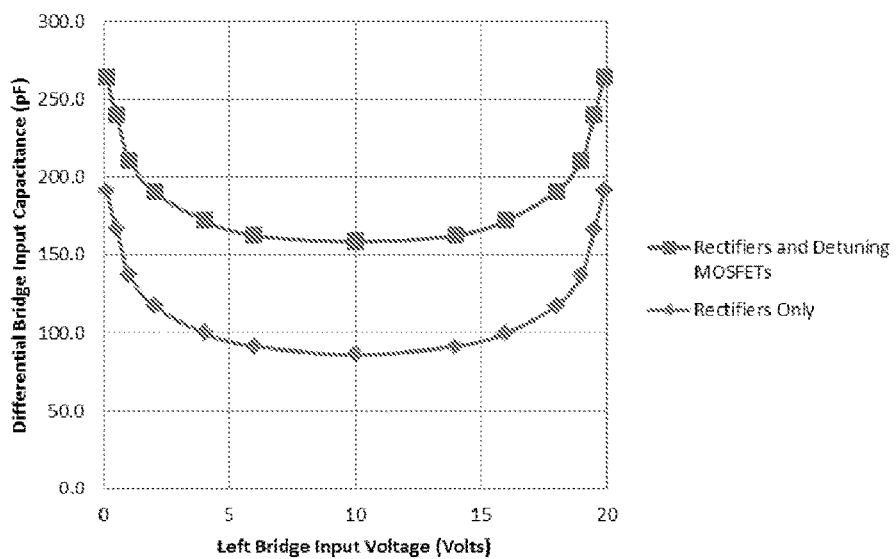
FIGS. 8 and 9 show the differential-input capacitance of the bridge rectifier.

In a full-wave rectifier arrangement, the actual capacitance at the input of the full-wave rectifier changes as different rectifiers transition between conducting and non-conducting states. That is, the overall capacitance at the input of the full-wave rectifier is related to a combination of the changing capacitances of each of the individual rectifiers. For example, if the rectifier includes four diodes in a full-bridge arrangement, then the capacitance is at a maximum value just before diode conduction for each polarity of an AC voltage waveform that is applied to the bridge rectifier input. At the midpoint of the switching cycle, the differential-input voltage of the bridge rectifier is zero or nearly zero, and the capacitance is at its minimum value. The rectifiers included in the left or right bridge legs of a typical full-wave rectifier have capacitances that combine in parallel. The left- and right-bridge-leg capacitances then combine in series to provide a differential-input capacitance for the bridge rectifier, as shown in FIG. 8. In addition, if any detuning MOSFETs (metal-oxide semiconductor field effect transistors) are included at the rectifier input, the MOSFETs also exhibit a similar nonlinear reverse capacitance that combines in parallel with the left- and right-bridge-leg capacitances. The influence of these MOSFETs on the differential-input capacitance of the bridge rectifier is also shown in FIG. 8.

Figure 9:
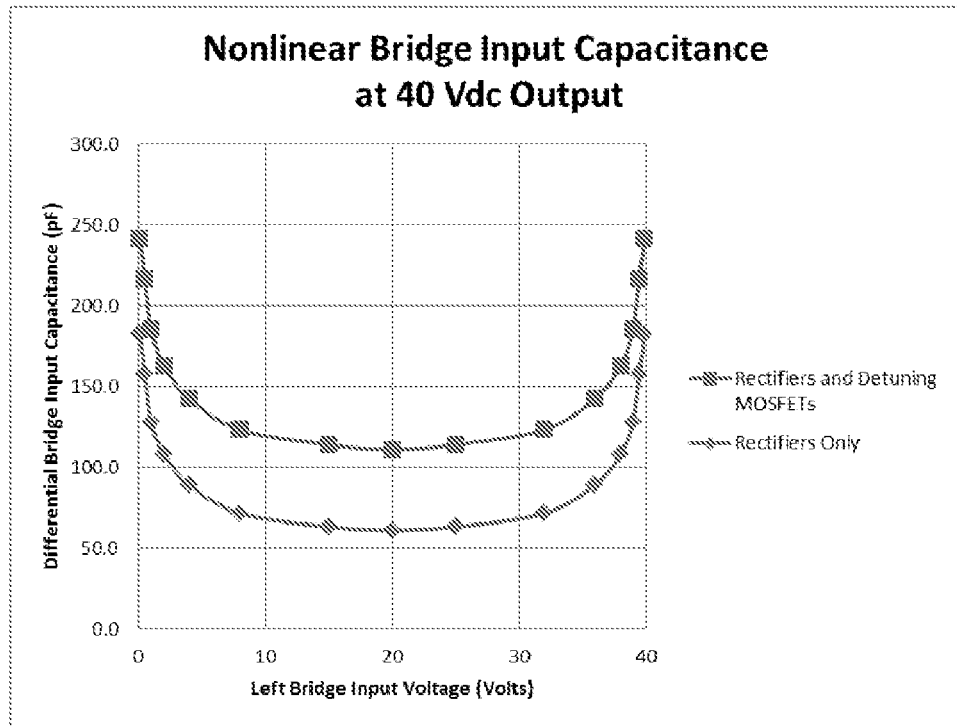

The average rectifier-bridge-leg input capacitance over a switching cycle is a combination of two reverse-biased rectifiers. That is, one rectifier begins the switching cycle at zero volts or substantially zero volts where the capacitance is highest, but the opposite rectifier in the bridge leg begins the switching cycle at Vout. This is due to the junction capacitance of a diode being maximized when zero volts is applied across the diode and minimized when a rated reverse voltage is applied to reverse bias the diode (the junction capacitance is essentially shorted when the diode is forward biased). In other words, the higher the DC output voltage, the lower the opposite rectifier input capacitance at the beginning of the switching cycle. This results in a lower effective average differential-input capacitance of the bridge rectifier as the DC output voltage is increased. As shown in FIGS. 8 and 9, when the DC output voltage is increased from 20 Vdc to 40 Vdc, the capacitance decreases.

Figure 10:
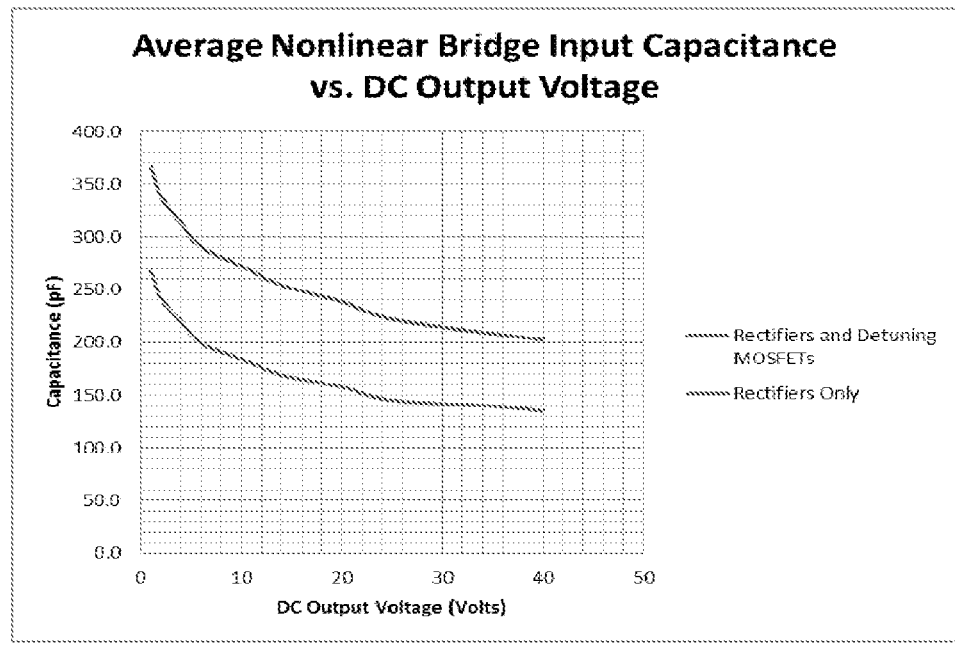
FIG. 10 shows a relationship between the average differential-input capacitance of the bridge rectifier and the DC output voltage.

In order to model the equivalent differential-input capacitance of the bridge rectifier, which is part of the parallel-resonant capacitor Cs2 shown in FIG. 2, the relationship between the average differential-input capacitance of the bridge rectifier and the DC output voltage Voutdc shown in FIG. 1 must be determined. This relationship can be determined by integrating capacitance curves, similar to those shown in FIGS. 8 and 9, for each DC output voltage to be analyzed, and then dividing the integral by the DC output voltage. This provides a relationship between the average differential-input capacitance of the bridge rectifier and the DC output voltage, as shown in FIG. 10.

According to the method of determining and accounting for the nonlinear effects of the receiver rectifiers as described above, changes in the received voltage as a function of the coupling coefficient K and the load can be determined. Particularly, the nonlinear effects are accounted for by averaging the nonlinear capacitance at the bridge rectifier input over an entire switching cycle, for each output voltage from zero to the maximum output voltage of the receiver. Using the model shown in FIG. 2, three equations are needed to transform the resonant wireless-power-transfer system to a linear approximation at the first harmonic:

$Vinrms = Vin * \sqrt{2/\pi}$;

$Voutrms = Voutdc * \sqrt{8/\pi}$; and $Rldac = 8 * Rld/\pi^2$.

According to the relationship between the average nonlinear bridge input capacitance and the DC output voltage shown in FIG. 10, multiple simulations using AC analysis can be run, wherein the nonlinear bridge input capacitance is adjusted until the calculated DC output voltage corresponds to the voltage that provides the same or substantially the same capacitance as shown in FIG. 10. Simulations were performed so that the nonlinear capacitance could be adjusted as a function of the output voltage, without the need to perform extensive and complex calculations and/or measurements to determine a closed-form solution.

With the simplified equivalent circuit and the method of analysis described above, a complete wireless-power-transfer system is tuned to receive power over a wide range coil-separation distances without requiring retuning of the system resonances. In addition, the received DC output voltage is limited by using the nonlinear rectifier reverse-biased capacitance to automatically shift the receiver resonant frequency higher as the voltage increases, thus locating an operating point where the receiver gain, and thus received DC output voltage, is limited by the nonlinear rectifier capacitance. Due to the limit on the received DC output voltage, a DC-DC converter can be added at the output of the receiver to provide a fixed, regulated DC output voltage even if the received voltage varies significantly with coil position and coil-separation distance. Furthermore, according to a receiver output V-I characteristic (which is a function of the specific tuning), the coupling coefficient K between the primary and secondary coils, and the nonlinear rectifier reverse-biased capacitance, power limiting can be provided for the DC-DC converter circuit to limit the current drawn from the receiver to the amount of current that is actually available. This prevents the negative input impedance of the DC-DC converter stage from overloading the receiver output, thus allowing power transfer to continue.

A specific tuning methodology is described herein to provide the above-described results. A transmit amplifier is attached to a primary (transmit) coil through a series-resonant capacitor. The series-resonant capacitor is selected so as to generate a resonant frequency with the primary coil that is slightly below the fixed operating frequency of the wireless-power-transfer system. That is, the wireless transmitter is operated slightly above resonance so that the loading on the transmit amplifier is inductive. The inductive loading facilitates zero-voltage switching and efficient operation of the transmit amplifier, while operating the transmitter close to resonance provides a nearly sinusoidal response for the coil current at the transmit frequency. Since the primary and secondary coils are typically loosely-coupled at a separation distance of at least one coil diameter, transmitter tuning changes become increasingly insignificant as the coils are moved apart, and the transmitter operation can be tuned without a receiver coil present. That is, with the transmitter tuning method according to preferred embodiments of the present invention, the primary and secondary coils are assumed to be so far apart that the receiver has no influence on the transmitter, i.e., the condition when K=0. This allows the wireless-power-transfer system to be tuned to be resonant at the highest coil-separation distance, while still permitting power to be transferred at lower coil-separation distances.

Next, a receiver is added. The receiver includes a receiver coil, a series-resonant capacitor, a rectifier bridge with a nonlinear reverse-biased capacitance at its input, and an output-filter capacitor to filter the rectified power to a DC output voltage. With the transmitter operating, the receiver is placed at a predetermined maximum operating distance and then coarsely tuned by selecting the secondary series-resonant capacitor Cs1. Then the receiver is fine-tuned by an adjustable capacitor arranged in parallel with the rectifier bridge input, until a maximum amount of power is received. Optionally, detuning MOSFETs can be added to the center of each bridge leg of the rectifier bridge through series detuning capacitors. Further, a fixed capacitor can be added at the bridge rectifier input to adjust the ratio between the series-resonant capacitor Cs1 and the parallel-resonant capacitor Cs2 and to also adjust the degree of nonlinearity of the parallel-resonant capacitor Cs2.

Once the receiver is tuned for maximum power at the maximum operating distance, the resulting output V-I characteristic of the receiver can be evaluated as a function of distance and load.

For example, simulations for a 27.12 MHz wireless-power-transfer system were run using the following model values in FIGS. 1 and 2: Vin=40 Vdc; Cp=32 pF; Rp=0.6Ω; Lp=1.11 µH; Ls=1.11 µH; Rs=1.2Ω; and Cs1=35 pF. The value for the parallel-resonant capacitor Cs2 is taken from the top curve of the graph shown in FIG. 10, while K is varied from 0.003 to 0.04. The load Rld is also varied such that the receiver output V-I characteristic is traced for load conditions from no load to overload. The results of this simulation are shown in FIG. 11.

Figure 11:
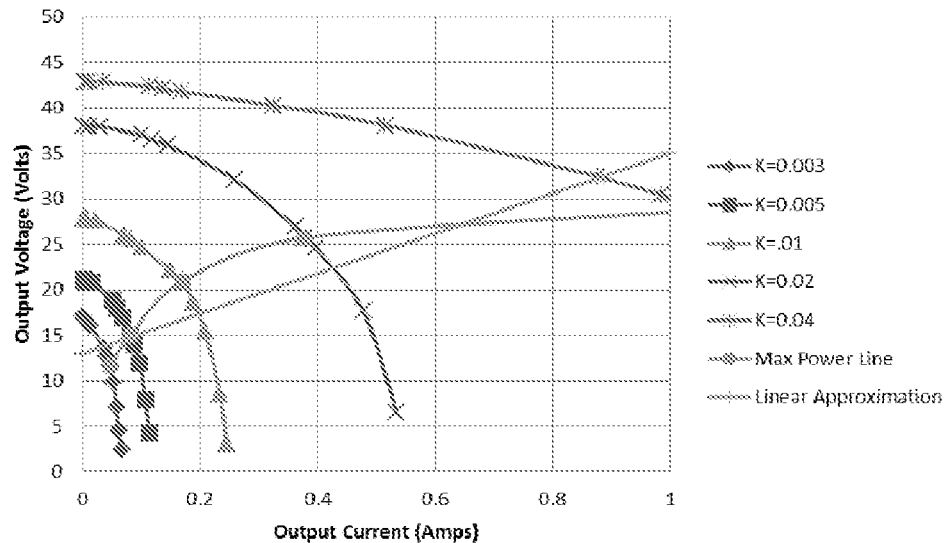
FIG. 11 shows a simulated receiver output characteristics as a function of coupling coefficient according to a preferred embodiment of the present invention.

FIG. 11 shows that significant power is transferred from the primary coil to the secondary coil over a wide range of the coupling coefficient K, while using a fixed set of tuning parameters. FIG. 11 also shows that receiver output voltage in this example is always limited to less than 45 Vdc, and that the output characteristics of the receiver provide information necessary to establish a variable-power limit as a function of distance or the coupling coefficient K. The maximum power line in FIG. 11 shows a monotonic increase in output voltage with increased coupling such that, for any given received voltage, there is a load current that must not be exceeded in order to prevent an overload condition in the receiver. Digital methods, such as a curve fit of the nonlinear maximum-power line, can be performed using polynomials or lookup tables to determine the maximum-power line. Alternately, a simple error-amplifier circuit, for example, can be used to provide a linear approximation of the maximum-power line to implement power limiting for the receiver.

Figure 12:
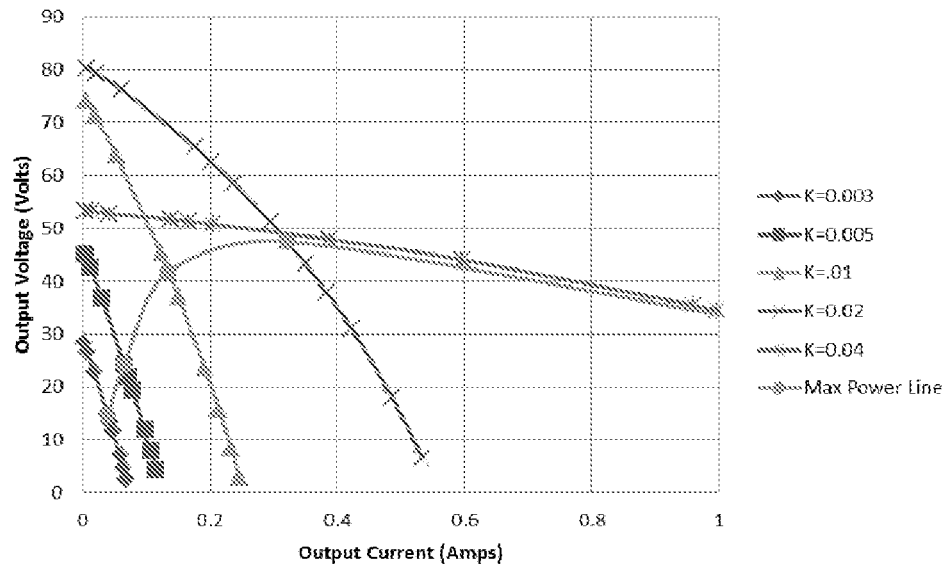
FIG. 12 shows a simulated receiver output characteristics as a function of coupling coefficient according to a comparative example.

As a comparative example, a second set of simulations was run under the same conditions as described above, except that a linear parallel-resonant capacitor Cs2' was used in place of the nonlinear parallel-resonant capacitor Cs2. The linear parallel-resonant capacitor Cs2' was set to be equal to the nonlinear value of the nonlinear parallel-resonant capacitor Cs2 that provides the highest output power at K=0.003, as shown in FIG. 11. Although the receiver output voltage constantly changes as a function of the load, which causes the nonlinear value of the nonlinear parallel-resonant capacitor Cs2 to also change, only the value at the maximum power output voltage with K=0.003 was used for the linear comparison, in order to show how the load line response changes if there were no non-linearity in the tuning capacitance. The results of the second set of simulations are shown in FIG. 12.

When the linear parallel-resonant capacitor Cs2' was used in the receiver, the maximum power at K=0.003 is the same as when the nonlinear parallel-resonant capacitor Cs2 was used. However, as the load and the coupling coefficient K were varied, the DC output voltage was not limited, because the linear parallel-resonant capacitor Cs2' did not decrease as the DC output voltage increased. Also, there is no well-defined linear approximation that can be made to the maximum power line, and there is no longer a monotonic increase in the DC output voltage at the maximum power point as the coupling coefficient is increased.

Figure 13A:
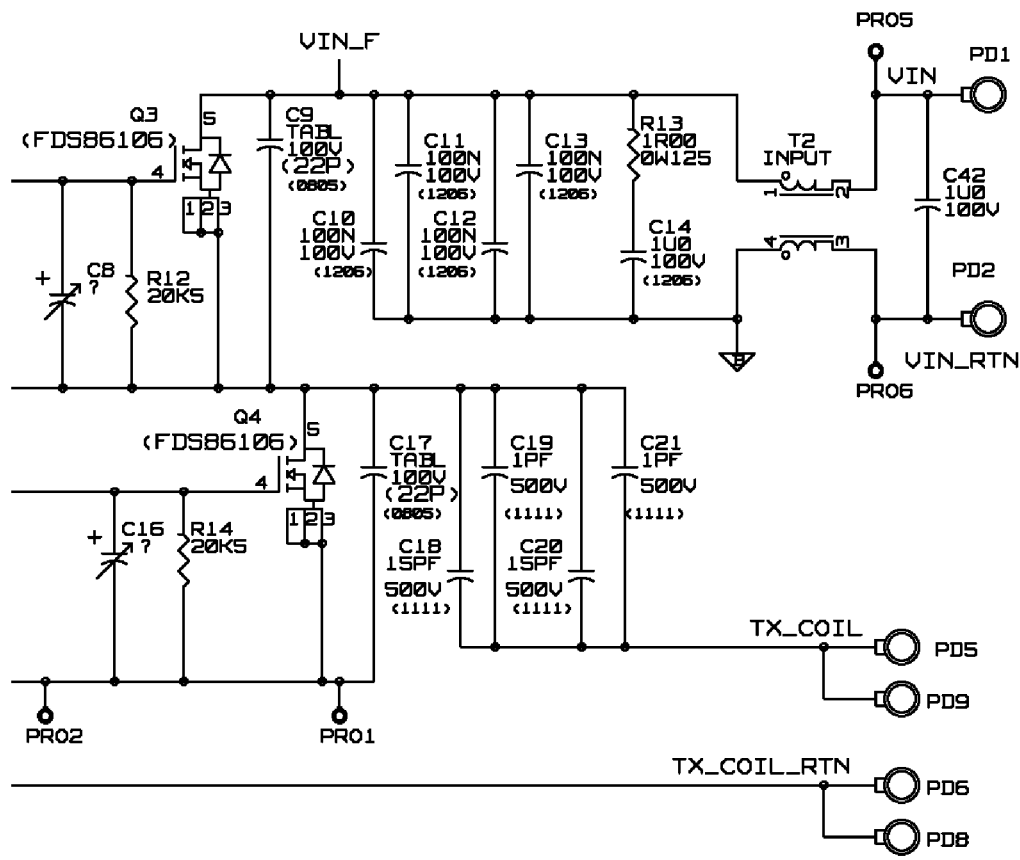
FIG. 13A is a circuit diagram showing a class-D power stage according to a preferred embodiment of the present invention.
Figure 13B:
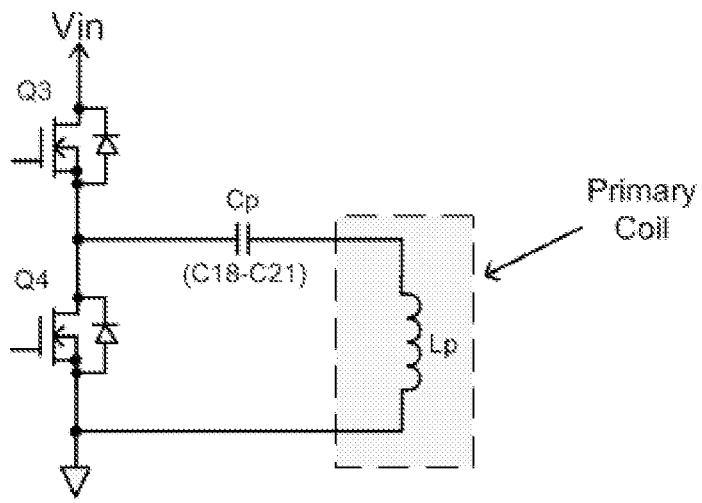
FIG. 13B is a simplified circuit diagram of the circuit diagram shown in FIG. 13A.

In a preferred embodiment of the present invention, a class-D amplifier is preferably used to drive the primary coil. FIG. 13A is a circuit diagram showing a class-D power stage, and FIG. 13B is a simplified diagram of the circuit diagram shown in FIG. 13A. Transistors Q3 and Q4 are connected in a half-bridge configuration and are alternately switched off and on to provide a square wave or trapezoidal wave to the input of the resonant tank circuit. The resonant tank includes a series-resonant capacitor (which includes capacitors C18 to C21) and the primary coil Lp. To minimize power losses in the transmitter circuit, the capacitors that define the series-resonant capacitor are preferably low-loss RF ceramic capacitors, for example. The primary coil Lp preferably includes two turns of AWG10 (about 2.6 mm) magnet wire formed in a loop with a diameter of about 11.4 cm, for example. A spacing between the turns of the primary coil is preferably about 4 mm, for example, to lower the AC resistance of the primary coil by reducing the proximity effect between the two turns of the primary coil. The primary coil or capacitance is adjusted to a resonant frequency slightly below the operating frequency so that enough of an inductive load is applied to the class-D power stage to provide zero-voltage switching (ZVS) of the half-bridge transistors. An input filter is also provided for the class-D power stage and includes capacitor C42, transformer T2, and capacitors C10 to C13. The transformer T2 is preferably a common-mode choke. In addition, a damping network including resistor R13 and capacitor C14 prevents modulation of the transmitted power with low-frequency ringing from the input-filter resonance.

According to other preferred embodiments of the present invention, other amplifiers, including class-E amplifiers, class-E push-pull amplifiers, and class-E/F odd amplifiers can be used to drive the primary coil. Further, a class-E amplifier can be used in the resonant-gate-drive section of a class-D amplifier to drive the gates of the transistors in the class-D amplifier with a resonant sine wave.

Figure 14:
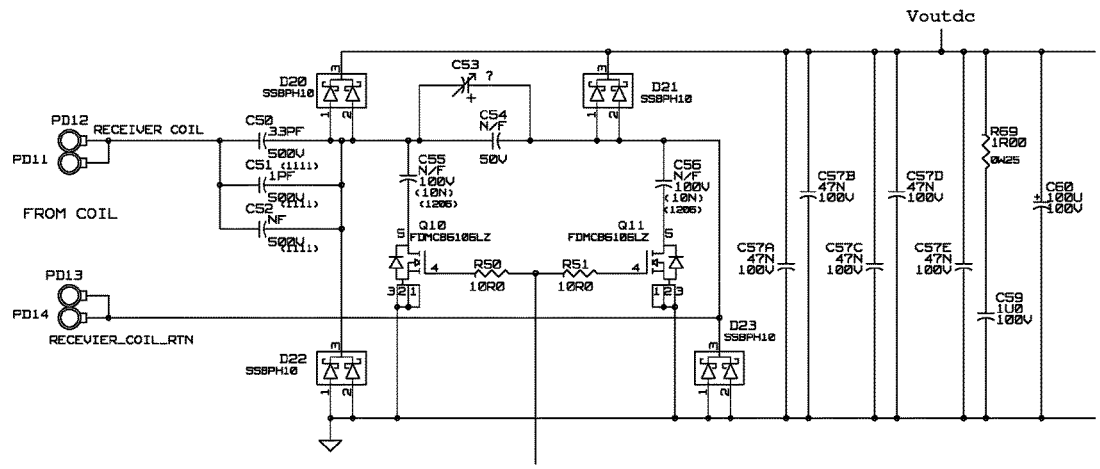
FIG. 14 is a circuit diagram showing a wireless receiver according to a preferred embodiment of the present invention.

In a preferred embodiment of the present invention, a full-wave-rectified series-resonant network is preferably used to connect the receive (secondary) coil to the rectifier bridge input, wherein the nonlinear parallel-resonant capacitor Cs2 at the input of the rectifier bridge is larger than the secondary series-resonant capacitor Cs1, and the nonlinear element of the nonlinear parallel-resonant capacitor Cs2 becomes smaller as the rectified output voltage increases. FIG. 14 is a circuit diagram showing the wireless receiver.

The resonant network includes the secondary series-resonant capacitor Cs1, the total capacitance at the input of the rectifier bridge, the parallel-resonant capacitor Cs2, and the receive coil. To minimize power losses in the receiver, the secondary series-resonant capacitor Cs1 is preferably a low-loss RF ceramic capacitor. The secondary coil preferably includes two turns of AWG12 (about 2.1 mm) magnet wire formed in a loop with a diameter of about 11.4 cm, for example. Preferably, the secondary coil uses a smaller wire size than that of the primary coil since less current flows through the secondary coil. However, the same wire size may be used for both the primary and secondary coils. A spacing between the turns of the secondary coil is preferably about 4 mm, for example, to lower the AC resistance of the secondary coil by reducing the proximity effect between the two turns of the secondary coil. More specifically, the AC resistance of each of the coils is higher than its DC resistance, due to both the skin effect and the proximity effect. Both effects cause a redistribution of current in the wires of the coils, which reduces the effective cross-section of the coils. Accordingly, the coils are preferably configured and constructed to reduce these effects.

The resonant voltage across the bridge-input capacitance, i.e., the parallel-resonant capacitor Cs2, is rectified by the bridge rectifier diodes D20 to D23 to produce a DC voltage across the output filter capacitor C60.

The total magnitude of the bridge-input capacitance is adjusted by the ratings of the rectifier diodes selected for the bridge rectifier, adding detuning MOSFETs that provide drain-to-source capacitances, adding a fixed capacitor at the input of the bridge rectifier, and adding an adjustable capacitor to fine tune the receiver resonant frequency at the greatest distance at which power is received. For example, transistors Q10 and Q11 shown in FIG. 14 may be configured as detuning MOSFETs. To tune the receiver to provide the maximum-gain response at the maximum distance, the series combination of the resonant capacitor and the bridge-input capacitance is tuned to provide the maximum power at the operating frequency. Therefore, the ratio Cs1/(Cs1+Cs2) scales the received output voltage as well as the ideal load impedance for maximum-power transfer. That is, the ratio of Cs1/(Cs1+Cs2) relates the voltage across the input of the bridge rectifier to the voltage across the secondary coil when the load across bridge input capacitance Cs2 is chosen for maximum output power. As the bridge input capacitance Cs2 is increased, the secondary series-resonant capacitor Cs1 must be made smaller so that the resonant frequency is equal or substantially equal to the operating frequency. This causes the voltage across the bridge input capacitance Cs2 to be lowered by this scaling factor, but because the same power can be provided, the load resistance for maximum output power is lowered, according to the equation $P_{max} = V_{cs2}^2/R_{ac}$.

The degree of nonlinearity of the bridge input capacitance Cs2 is controlled by the selection of appropriate ratings for the semiconductor elements and by the relative amount of linear capacitance provided by the addition of fixed or adjustable capacitors. A higher degree of nonlinear capacitance at the rectifier bridge input limits the range of voltage provided at the receiver output as a function of load. However, a higher degree of nonlinear capacitance at the rectifier bridge input also restricts the ability of the receiver to start receiving power at the maximum distance when the DC output voltage is zero. That is, at 0 volts output, the position of the upper resonant frequency fu moves too far below the operating frequency to provide sufficient resonant gain, even at no load, to provide the required output voltage.

Figure 15A:
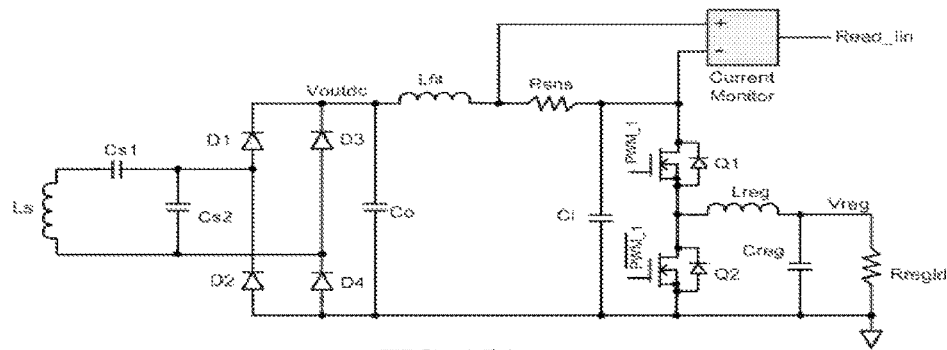
FIGS. 15A and 15B are circuit diagrams of a regulated receiver according to a preferred embodiment of the present invention.
Figure 15B:
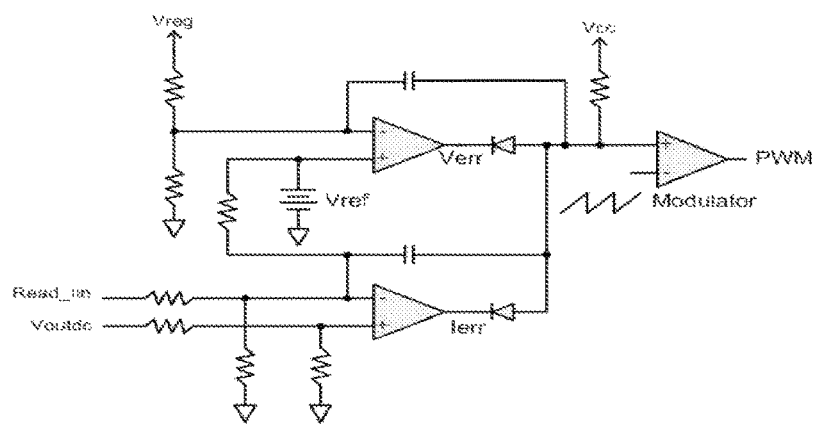

In order to provide useful power to a load, voltage regulation is preferably included because the raw output of the receiver varies significantly with coil separation and load. In a preferred embodiment of the present invention, a non-isolated DC-DC regulator is included between the output of the receiver and the load to provide regulated output power. A circuit diagram of the regulated receiver is shown in FIGS. 15A and 15B.

Referring to FIG. 11, under normal conditions when there is sufficient power available to operate the load at full power, an operation is limited to the upper-left region of the graph, above the maximum-power line. In this case, voltage regulation is performed by the voltage loop amplifier, and the power stage PWM duty cycle is controlled by the error signal Verr shown in FIGS. 15A and 15B. However, if the load is increased or if the coupling coefficient is reduced, operation may be pushed to the lower right of the graph shown in FIG. 11, below the max power line. Because the DC-DC regulator provides constant output power, its input also contains a constant power characteristic. That is, as the input voltage is reduced, the input current must be increased to maintain constant power. This behavior can be represented by a negative impedance, and prevents stable operation below the maximum-power line. In particular, this behavior results in an overload of the receiver output, and the collapse of receiver output voltage Voutdc. The receiver output voltage Voutdc, which represents the unregulated DC output voltage of the receiver rectifier bridge, is the voltage across the load Rld as shown in FIG. 1.

In order to prevent overloading at the receiver output, a current-regulation amplifier is included to reduce the load on the receiver to a level that is available, based on the characteristics shown in FIG. 11. The current-regulation amplifier is shown in FIGS. 15A and 15B, and its response is adjusted to provide the linear approximation shown in FIG. 11. As shown in the lower portion of FIGS. 15A and 15B, the receiver output voltage Voutdc is scaled by a voltage divider and used as a reference for the current loop amplifier. The current taken from the receiver is sensed and scaled by a current monitor to provide a proportional voltage Read_lin. The proportional voltage Read_lin and a fixed voltage Vref are summed and scaled at the inverting input of the current-loop amplifier to provide a proper gain and offset to match the linear approximation line shown in FIG. 11.

The fixed voltage Vref is a fixed, regulated voltage and is preferably provided by a linear regulator or a voltage divider from another regulated voltage source, such as a bias regulator connected to the receiver output voltage. It is used in the current loop amplifier to produce an offset in the response so that zero current corresponds to a non-zero DC output voltage of the receiver. Further, an error signal Ierr controls the PWM duty cycle of the DC-DC converter, which is operating as a buck regulator, such that the input current to the buck regulator at the proportional voltage Read_lin follows the set point established by the receiver output voltage Voutdc with an offset provided by the fixed voltage Vref.

Accordingly, the receiver load current can be forced to follow a changing limit that is established by the voltage present at the output of the receiver. Additionally, because the nonlinear bridge input capacitance is used to provide a voltage limited V-I characteristic, a monotonically increasing voltage is generated at the maximum-power point as the transmit and receive coil separation distance is reduced. Thus, a linear approximation and a simple amplifier circuit can be used to provide receiver power limiting.

If the error signal Verr generated by the voltage-loop amplifier has a greater magnitude than the error signal Ierr generated by the current-loop amplifier, regulation is controlled by error signal Ierr through a set of analog ORing diodes arranged at the outputs of the voltage-loop and current-loop amplifiers. This causes the regulated output voltage to drop until the current output of the receiver matches the corresponding voltage present at the output of the receiver. If the transmit and receive coils are subsequently moved closer together, the voltage at the output of the receiver increases, which allows a higher current output for the receiver until the error signal Ierr is greater than the error signal Verr and normal output voltage regulation resumes.

According to preferred embodiments of the present invention, a rectifier nonlinear capacitance is provided as part of an overall resonant network such that reductions in the rectifier capacitance as the rectifier output voltage increases result in the automatic retuning of the receiver resonance to a higher frequency. Although the preferred embodiments of the present invention are described with respect to the coil-separation distance between the primary coil of the transmitter and the secondary coil of the receiver, the preferred embodiments of the present invention are not limited thereto. For example, the preferred embodiments of the present invention are also applicable to wireless-power-transfer systems where the primary and secondary coils are not centered with respect to each other, or where the primary and secondary coils are angled with respect to each other. Particularly, the coupling coefficient K is related not only to the coil-separation distance, but also to the alignment of the coils. Accordingly, a wireless-power-transfer system according to the preferred embodiments of the present invention is also able to compensate for variations in the centering and angling of the primary and secondary coils.

According to preferred embodiments of the present invention, the output voltage of a DC-DC regulator is not used to regulate the output voltage. This provides several useful functions and implementations for wireless-power transfer if overload conditions occur, for example:

1) Lights can continue to operate at reduced intensity;
2) Motors can continue to operate at reduced speed and/or torque;
3) Batteries can continue to charge at a reduced rate;
4) Equipment can be informed of the beginning of an overload condition by directly sensing the error signals Verr and Ierr, the difference between the error signals Verr and Ierr, or a regulated output voltage Vreg of the DC-DC converter stage, and thus the equipment can be reconfigured or rearranged to reduce power draw.

Various modifications can be made in accordance with the preferred embodiments of the present invention described herein:

1) A class-E, -E/F, -F, etc. amplifier can be used in the transmitter instead of the class-D amplifier.
2) In the receiver, a center tapped secondary coil can be used with two rectifiers, in place of the single coil with four rectifiers as described above.
3) The secondary coil of the receiver can have one end grounded and the other end coupled through a resonant capacitor to the midpoint of a single rectifier bridge leg as a half-wave rectifier.
4) The power-limiting amplifier can be connected through the voltage-loop amplifier using different connection methods to provide receiver power limiting, in place of the analog ORing diodes for the voltage and current loop amplifiers as described above. For example, the error signal Ierr can be routed through the input of the voltage loop amplifier.
5) The DC-DC regulator can use current-mode control, which provides another possible location to arrange the power-limiting amplifier. That is, the voltage-loop amplifier and current-loop amplifiers can still be ORed, but the ORed signal can instead be applied to another current-loop amplifier for the DC-DC inductor, or a switch current can be used instead of directly applying the ORed signal to PWM modulator.
6) Instead of using the receiver output voltage Voutdc to set a limit for the current-loop amplifier, power limiting can be achieved by using a fixed voltage (e.g., the fixed reference voltage Vref) to set the limit for the current-loop amplifier.
7) In the case of battery charging, a similar scheme can be used to reduce receiver load by reducing the charging current instead of the output voltage. This is similar to the current-mode control of the DC-DC converter described above.
8) A nonlinear maximum power curve which matches the power transfer max power line shown in FIG. 11 can be directly used, instead of the linear approximation and analog amplifier. That is, a lookup table or polynomial can be used to set the power limited receiver output current based on the voltage present at the receiver output. This current reference voltage can then be applied directly to the non-inverting input of the current-loop amplifier, or a PID or other type of compensator can be used for digital control.
9) The preferred embodiments of the present invention can be applied to constant-power limiting circuits included in the front-end rectifiers of telecom and datacom power supplies that are used to charge batteries and supply loads. The constant-power limiting circuits are preferably used to provide constant power with a relatively high current limit and a relatively low output voltage, such that batteries can be recharged at a low voltage while supplying a constant amount of power to the telecom and datacom equipment. The entire power supply, including the constant-power limit circuits, may be referred to as a "rectifier" in accordance with the terminology commonly used in the telecom and datacom arts.

10) The power-limiting point, which is based on the raw receiver output voltage, can be tuned to be a function of distance so that power limit can be reduced as coil-separation distance is increased.

It should be understood that the foregoing description is only illustrative of the present invention. Various alternatives and modifications can be devised by those skilled in the art without departing from the present invention. Accordingly, the present invention is intended to embrace all such alternatives, modifications, and variations that fall within the scope of the appended claims.

What is claimed is:

1. A wireless-power-transfer system comprising:
    a transmitter circuit including:
        a DC input;
        an oscillator-controlled drive stage connected to the DC input and providing an output at a fixed frequency;
        a primary series-resonant capacitor connected to the oscillator-controlled drive stage; and
        a transmitting coil connected to the primary series-resonant capacitor; wherein
        a transmitting resonant frequency is defined by the primary series-resonant capacitor and the transmitting coil; and
        the transmitting resonant frequency is below the fixed frequency of the oscillator-controlled drive stage; and
    a receiver circuit including:
        a receiving coil;
        a secondary series-resonant capacitor connected in series with the receiving coil;
        a secondary parallel-resonant capacitor connected in parallel with the receiving coil;
        a rectifier circuit connected to the secondary series-resonant capacitor and the secondary parallel-resonant capacitor and including at least one rectifier; and
        an output filter capacitor connected to the rectifier circuit and arranged to receive a rectifier-circuit DC output; wherein
        a receiving resonant frequency is defined by the secondary series-resonant capacitor, the secondary parallel-resonant capacitor, the receiving coil, and a nonlinear capacitance of the at least one rectifier; and
        the receiving resonant frequency increases as a nonlinear capacitance of the at least one rectifier decreases when the rectifier-circuit DC output increases.

2. A wireless-power-transfer system of claim 1, wherein a coupling coefficient between the transmitting coil and the receiving coil is about K=0.1 to about K=0.001.

3. A wireless-power-transfer system of claim 1, wherein the wireless-power-transfer system operates over a range of coil-separation distances between the transmitting coil and the receiving coil of about one to about five coil diameters of the transmitting coil.

4. A wireless-power-transfer system of claim 1, wherein the transmitting coil and the receiving coil have a same or substantially a same diameter and are positioned to achieve maximum coupling.

5. A wireless-power-transfer system of claim 1, wherein the rectifier circuit is a full-wave bridge rectifier.

6. A wireless-power-transfer system of claim 5, further comprising detuning MOSFETs connected to a center of each bridge leg of the full-wave bridge rectifier through series detuning capacitors.

7. A wireless-power-transfer system of claim 5, further comprising a fixed capacitor connected to an input of the full-wave bridge rectifier.

8. A wireless-power-transfer system of claim 1, further comprising a non-isolated DC-DC regulator connected to the receiver circuit.

9. A wireless-power-transfer system of claim 1, further comprising a current-regulation amplifier connected to the receiver circuit.

10. A wireless-power-transfer system of claim 1, wherein:
    the wireless-power-transfer system includes an upper resonant frequency and a lower resonant frequency; and
    the upper resonant frequency is associated with a greatest predetermined coil-separation distance between the transmitting coil and the receiving coil.

* * * * *